United States Patent
Ueno (10) Patent No.: US 9,011,052 B2
(45) Date of Patent: Apr. 21, 2015

(54) VIBRATION SUPPRESSING METHOD AND VIBRATION SUPPRESSING DEVICE FOR US IN MACHINE TOOL

(75) Inventor: Hiroshi Ueno, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 832 days.

(21) Appl. No.: 13/245,117

(22) Filed: Sep. 26, 2011

(65) Prior Publication Data

US 2012/0093603 A1    Apr. 19, 2012

(30) Foreign Application Priority Data

Oct. 13, 2010  (JP) .................................. 2010-230685

(51) Int. Cl.
   *B23Q 15/007* (2006.01)
   *G05B 19/404* (2006.01)

(52) U.S. Cl.
   CPC ....... *G05B 19/404* (2013.01); *Y10T 409/30084* (2015.01); *B23Q 15/007* (2013.01); *G05B 2219/42344* (2013.01)

(58) Field of Classification Search
   CPC .... B23Q 15/007; B23Q 15/013; B23Q 15/08; B23Q 15/10; B23Q 15/12; B23Q 17/0971; B23Q 17/0976
   USPC .......... 408/8, 9; 409/134, 141, 186, 187, 193, 409/194
   See application file for complete search history.

(56) References Cited

U.S. PATENT DOCUMENTS

| | | | |
|---|---|---|---|
| 6,476,575 B1 * | 11/2002 | Fainstein et al. | 318/569 |
| 2002/0146296 A1 * | 10/2002 | Schmitz et al. | 409/131 |
| 2004/0179915 A1 * | 9/2004 | Hill et al. | 409/131 |
| 2008/0289923 A1 * | 11/2008 | Suzuki et al. | 188/379 |
| 2009/0069927 A1 * | 3/2009 | Suzuki et al. | 700/177 |
| 2009/0110499 A1 * | 4/2009 | Inagaki | 408/143 |
| 2009/0187270 A1 * | 7/2009 | Hoefler | 700/177 |
| 2010/0104388 A1 * | 4/2010 | Suzuki et al. | 409/131 |
| 2011/0135415 A1 * | 6/2011 | Hamaguchi et al. | 409/79 |

FOREIGN PATENT DOCUMENTS

JP    2003-340627 A1    12/2003

* cited by examiner

*Primary Examiner* — Sunil K Singh
*Assistant Examiner* — Alan Snyder
(74) *Attorney, Agent, or Firm* — Burr & Brown, PLLC (57) ABSTRACT

In a machine tool having a rotary shaft for use in rotating a tool or a workpiece, a plurality of stable rotation speeds at which the chatter vibrations are expected to be suppressed, and at least one switching rotation speed across which a dynamic characteristic of a rotary shaft system changes are stored. The plurality of stable rotation speeds may be determined from chatter vibrations detected using a vibration detection unit. Optimum rotation speed that is a rotation speed to which a rotation speed of the rotary shaft is changeable without crossing the switching rotation speed is selected from the plurality of stable rotation speeds, and the rotation speed of the rotary shaft is changed to the optimum rotation speed. Thus, chatter vibrations generated during rotation of the rotary shaft can be suppressed effectively.

9 Claims, 4 Drawing Sheets

VIBRATION SUPPRESSING METHOD AND VIBRATION SUPPRESSING DEVICE FOR US IN MACHINE TOOL

CROSS-REFERENCE TO RELATED APPLICATION

This application claims the benefit of Japanese Patent Application Number 2010-230685 filed on Oct. 13, 2010, the entirety of which is incorporated by reference.

BACKGROUND OF THE INVENTION

1. Field of the Invention

The present invention relates to a vibration suppressing method for use in a machine tool which performs a machining operation on a workpiece with a tool while rotating the tool or the workpiece, for suppressing chatter vibrations generated during the machining operation, and a vibration suppressing device for executing such a vibration suppressing method.

2. Description of Related ART

An example of hitherto-known vibration suppressing methods for use in a machine tool which performs a machining operation with a rotary shaft (i.e., main spindle) being rotated is disclosed in Japanese Patent Application Laid-Open Publication 2003-340627 In this vibration suppressing method, in order to suppress chatter vibrations which would cause deterioration in the accuracy of a finished surface of the workpiece, destruction of the tool and other detrimental effects, natural frequencies of systems (e.g., a tool, a workpiece, etc.) in which the chatter vibrations occur are determined. Then, the determined values are multiplied by 60 and divided by the number of tool flutes and a predetermined integer to obtain a value assumed to be a stable rotation speed, so that the chatter vibrations which would occur during the machining operation can be suppressed by performing the operation with this stable rotation speed. It is to be understood that the obtained stable rotation speed includes several values such as a first speed obtained with integer "1", a second speed obtained with integer "2", and the like.

Many of the generally prevailing machine tools known in the art practically adopt a method of changing gears according to the rotation speeds of the main spindle in order to acquire an adequate motor torque over a broad range of rotation speeds of the main spindle. In cases where higher-speed rotation of the main spindle is required, also, many known machine tools adopt a method of changing a preload of bearings for supporting the main spindle according to the rotation speeds of the main spindle in order to prevent the main spindle from being damaged by heat. These methods of changing the gears or the preload of the bearings would change the dynamic characteristics of the main spindle system according to the rotations speeds of the main spindle.

Referring back to Japanese Patent Application Laid-Open Publication 2003-340627, the stable rotation speeds obtained to suppress chatter vibrations are derived from the "natural frequencies of systems in which the chatter vibrations occur", as described above. Since the dynamic characteristics of the main spindle system change according to the rotation speeds of the main spindle, some of the obtained stable rotation speeds would possibly become rotation speeds at which the chatter vibrations could not be suppressed due to the change of the dynamic characteristics of the main spindle system when the rotation speed of the main spindle is changed to such a would-be stable rotation speed. As a result, even when the rotation speed of the main spindle is changed to one of the obtained stable rotation speeds, the method possibly fails to prevent the chatter vibrations in some instances.

The present invention has been made in an attempt to eliminate the aforementioned disadvantages, and illustrative, non-limiting embodiments of the present invention overcome the above disadvantages and other disadvantages not described above.

SUMMARY OF THE INVENTION

It is an aspect of the present invention to provide a vibration suppressing method and a vibration suppressing device in which an adequate stable rotation speed can be selected from the obtained stable rotation speeds without changing the dynamic characteristics of the main spindle system so that chatter vibrations can be suppressed without fail.

(1) More specifically, a vibration suppressing method implemented in a machine tool having a rotary shaft for use in rotating a tool or a workpiece, for suppressing chatter vibrations generated during rotation of the rotary shaft is provided according to one method aspect of the present invention. This vibration suppressing device comprises a first step of detecting chatter vibrations using a vibration detection unit, a second step of storing a plurality of stable rotation speeds at which the chatter vibrations are expected to be suppressed, and at least one switching rotation speed across which a dynamic characteristic of a rotary shaft system changes, a third step of selecting an optimum rotation speed from the plurality of stable rotation speeds, the optimum rotation speed being a rotation speed to which a rotation speed of the rotary shaft is changeable without crossing the switching rotation speed, and a fourth step of changing the rotation speed of the rotary shaft to the optimum rotation speed selected in the third step.

(2) The vibration suppressing method configured as described in (1) above may further comprise steps, in the second step, of determining a chatter frequency of the chatter vibrations detected in the first step, and determining the plurality of stable rotation speeds using the determined chatter frequency.

(3) In the above configuration (1), with or without the additional feature (2), the method may further comprise a step, in the second step, of storing an upper limit rotation speed and/or a lower limit rotation speed for each of types of the rotary shaft and/or types of the tool or the workpiece, wherein the optimum rotation speed to be selected in the third step is a rotation speed to which a rotation speed of the rotary shaft is changeable without crossing the switching rotation speed and which is within a range defined by the upper limit rotation speed and/or the lower limit rotation speed.

(4) In the above configuration (1), with or without either or both of the additional features (2) and (3), the method may further comprise a step, in the third step, of displaying a warning on a display device when no rotation speed to which a rotation speed of the rotary shaft is changeable without crossing the switching rotation speed is found in the plurality of stable rotation speeds stored in the second step.

(5) In one apparatus aspect of the present invention, a vibration suppressing device provided in a machine tool having a rotary shaft for use in rotating a tool or a workpiece, for suppressing chatter vibrations generated during rotation of the rotary shaft is disclosed. This vibration suppressing device comprises a vibration detection unit configured to detect chatter vibrations, a storage unit configured to store a plurality of stable rotation speeds at which the chatter vibrations are expected to be suppressed, and at least one switching rotation speed across which a dynamic characteristic of a rotary shaft system changes, an optimum rotation speed selection unit configured to select an optimum rotation speed from the plurality of stable rotation speeds, the optimum rotation speed being a rotation speed to which a rotation speed of the rotary shaft is changeable without crossing the switching rotation speed, and a rotation speed change unit configured to change the rotation speed of the rotary shaft to the optimum rotation speed selected in the optimum rotation speed selection unit.

With the configurations described above, various advantageous effects may be expected as follows.

According to one or more aspects of the present invention, as mentioned above particularly in (1) and (5), a plurality of stable rotation speeds and at least one switching rotation speed across which a dynamic characteristic of a rotary shaft system changes are stored, then an optimum rotation speed that is a rotation speed to which a rotation of speed of the rotary shaft is changeable without crossing the switching rotation speed is selected from the plurality of stable rotation speeds, and the rotation speed of the rotary shaft is changed to the optimum rotation speed selected. Accordingly, the possibilities of changing the rotation speed of the rotary shaft to such a would-be optimum rotation speed that changing the rotation speed to that optimum rotation speed changes the dynamic characteristic of the rotary shaft system, thus making it impossible to suppress chatter vibrations, can be avoided, so that the chatter vibrations can be suppressed more effectively than by any existing methods.

With the configuration described above in (2), in the second step, a chatter frequency of the chatter vibrations detected in the first step is determined and the plurality of stable rotation speeds to be stored are determined using the determined chatter frequency. The stable rotation speeds are determined based on the "chatter vibrations" actually occurring. Accordingly, the stable rotation speeds that are more effective against the actual chatter vibrations can be determined. Furthermore, an expensive device for impulse excitation, for example, can be dispensed with.

With the configuration described above in (3), an upper limit rotation speed and/or a lower limit rotation speed for each of types of the rotary shaft and/or a type of the tool and a type of the workpiece are stored, and the optimum rotation speed is a rotation speed to which a rotation speed of the rotary shaft is changeable without crossing the switching rotation speed and which is within a range defined by the upper limit rotation speed and/or the lower limit rotation speed. Therefore, the optimum rotation speed can be selected with consideration given to the upper limit rotation speed and/or the lower limit rotation speed for each of the types of the rotary shaft and/or the types of the tool or the workpiece.

With the configuration described above in (4), in the third step, a warning is displayed on a display device when no rotation speed to which a rotation speed of the rotary shaft is changeable without crossing the switching rotation speed is found in the plurality of stable rotation speeds stored in the second step. Therefore, an operator can easily recognize the occurrence of the aforementioned situation, and thus can swiftly attend to the situation, for example, by stopping the rotation of the rotary shaft, so that damage to the tool installed at the rotary shaft can be prevented.

BRIEF DESCRIPTION OF DRAWINGS

The above aspects, other advantages and further features of the present invention will become more apparent by describing in detail illustrative, non-limiting embodiments thereof with reference to the accompanying drawings.

DETAILED DESCRIPTION OF THE INVENTION

A vibration suppressing method and a vibration suppressing device according to one embodiment of the present invention will be described in detail with reference to the drawings.

Figure 1:
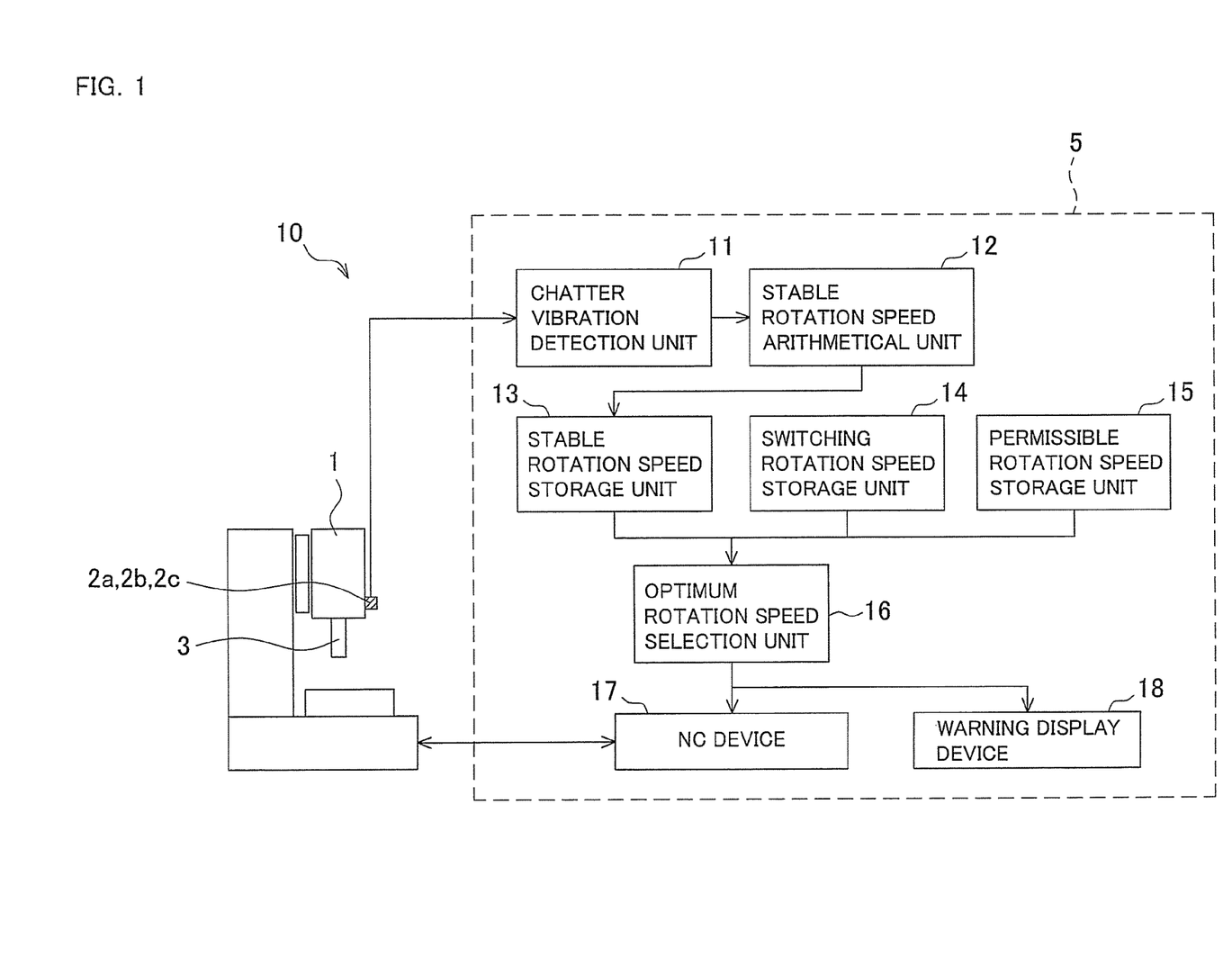
FIG. 1 is a block diagram of a vibration suppressing device.
Figure 2:
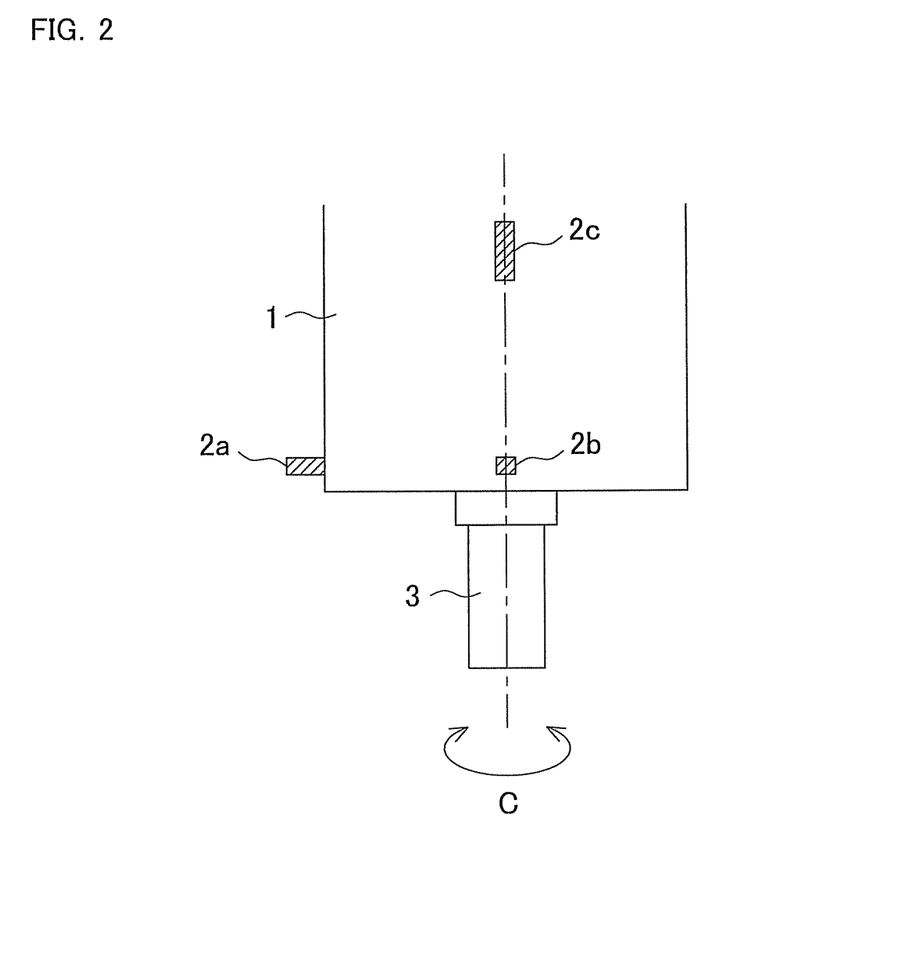
FIG. 2 is a schematic diagram of a rotary shaft housing (for which vibrations are to be suppressed) as viewed from sideward.

A vibration suppressing device 10 is a device for suppressing "chatter vibrations" occurring at a main spindle (rotary shaft) 3 provided in a rotary shaft housing 1, as shown in FIG. 1, in such a manner that the main spindle 3 is rotatable about a C-axis (see FIG. 2). The vibration suppressing device 10 includes vibration sensors 2a-2c configured to detect time-domain vibrational accelerations (i.e., vibrational accelerations on the time axis) that are characteristics possessed by vibrations occurring at the rotating main spindle 3. Further, the vibration suppressing device 10 includes a control device 5 configured to analyze the outputs of the vibration sensors 2a-2c, determine the presence or absence of the "chatter vibrations", and control the rotation speed of the main spindle 3 based on the results of determination. Inside the rotary shaft housing 1, a plurality of gears (not shown) for rotating the main spindle 3, and bearings (not shown) by which the rotary shaft 3 is rotatably supported are provided.

Figure 3:
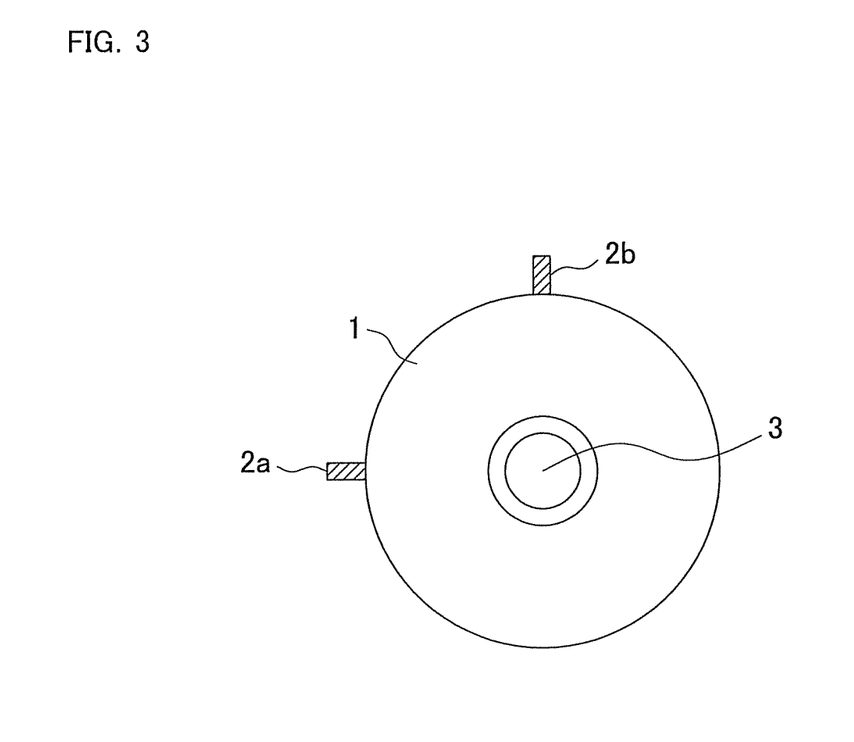
FIG. 3 is a schematic diagram of the rotary shaft housing as viewed in an axial direction thereof.

The vibration sensors 2a-2c are mounted at the rotary shaft housing 1 as shown in FIGS. 2 and 3, and configured such that one vibration sensor detects a time-domain vibrational acceleration in a direction perpendicular to directions of time-domain vibrational accelerations which the other two vibration sensors detect. For example, the vibration sensors 2a-2c are positioned so that the directions of the time-domain vibrational accelerations detected by the vibration sensors 2a-2c are along X-axis, Y-axis and Z-axis directions, respectively, which are orthogonal to each other.

The control device 5 includes a chatter vibration detection unit 11, a stable rotation speed arithmetical unit 12, a stable rotation speed storage unit 13, a switching rotation speed storage unit 14, a permissible rotation speed storage unit 15, an optimum rotation speed selection unit 16, a NC device 17, and a warning display device 18. The chatter vibration detection unit 11 is configured to perform an analysis on the time-domain vibrational accelerations detected by the vibration sensors 2a-2c to thereby obtain frequency-domain vibrational accelerations (i.e., vibrational accelerations on the frequency axis). The chatter vibration detection unit 11 determines that "chatter vibrations" have occurred when the maximum value of the obtained frequency-domain vibrational accelerations exceeds a predetermined threshold. The stable rotation speed arithmetical unit 12 is configured to compute (calculate) stable rotation speeds, in the event of detection of the chatter vibrations by the chatter vibration detection unit 11, by a formula described below with a chatter frequency corresponding to the maximum value of the frequency-domain vibrational accelerations. The stable rotation speed storage unit 13 is configured to store the stable rotation speeds calculated by the stable rotation speed arithmetical unit 12. The switching rotation speed storage unit 14 is configured to store a switching rotation speed across which the dynamic characteristic of the main spindle system changes.

The switching rotation speed includes, for example, a rotation speed of the main spindle 3 across which the gears are switched, and a rotation speed of the main spindle 3 across which a preload of bearings for supporting the main spindle 3 is switched. The permissible rotation speed storage unit 15 is configured to store a maximum rotation speed of the main spindle 3. The optimum rotation speed selection unit 16 is configured to select an optimum rotation speed for suppressing the "chatter vibrations" from the stable rotation speeds based on several conditions. The NC device 17 is configured to control the machining operation in the rotary shaft housing 1 by changing the rotation speed of the main spindle 3 and the gears or the preload of the bearings are switched according to the rotation speed of the main spindle 3. The warning display device 18 is configured to display a warning for an operator.

A control exercised by the vibration suppressing device 10 to suppress the "chatter vibrations" will be described hereinbelow.

In the present embodiment, the rotary shaft housing 1 has its internal gears configured to be switched if the rotation speed of the main spindle 3 exceeds 4,000 $\text{min}^{-1}$ during the machining operation performed by rotating the main spindle 3. In addition, the bearings for supporting the main spindle 3 are configured to receive a variable preload to be switched if the rotation speed of the main spindle 3 exceeds 12,000 $\text{min}^{-1}$. Furthermore, the maximum rotation speed of the main spindle 3 is set at 14,000 $\text{min}^{-1}$. For these purposes, at the outset, the operator operates an input device (not shown) to set a switching rotation speed at 4,000 $\text{min}^{-1}$ and 12,000 $\text{min}^{-1}$ as values to be stored in the switching rotation speed storage unit 14, and a maximum rotation speed at 14,000 $\text{min}^{-1}$ as a value to be stored in the permissible rotation speed storage unit 15.

In this embodiment, only the maximum rotation speed of the main spindle 3 is set as a value of the permissible rotation speed. However, with or without the maximum rotation speed set as an upper-limit value of the permissible rotation speed, a minimum rotation speed as a lower-limit value of the permissible rotation speed may be set on as needed basis. Then, in the selecting step which will be described later, a rotation speed higher than the lower-limit value may be selected as an optimum rotation speed, or a rotation speed in a range between the upper-limit value and the lower-limit value may be selected as an optimum rotation speed. It is to be understood that the upper-limit value and/or the lower-limit value of the rotation speed may be set for each of the types of the tool installed on the main spindle 3 (or for each of the types of the workpiece, in cases where a workpiece is supported at the main spindle 3).

Next, a machining operation on a workpiece is started by rotating the main spindle 3. Then, the chatter vibration detection unit 11 continuously monitors the main spindle 3 to determine whether or not "chatter vibrations" is occurring in such a way as described above. Detection of "chatter vibrations" using the vibration sensors 2a-2c as adopted in this embodiment may be implemented by a method described in detail in the applicant's own prior application as laid open under Japanese Patent Application Laid-Open Publication 2010-17783 (N.B.: a corresponding US patent application publication number US 2010/0010662 A1, which is now U.S. Pat. No. 8,005,574).

Figure 4:
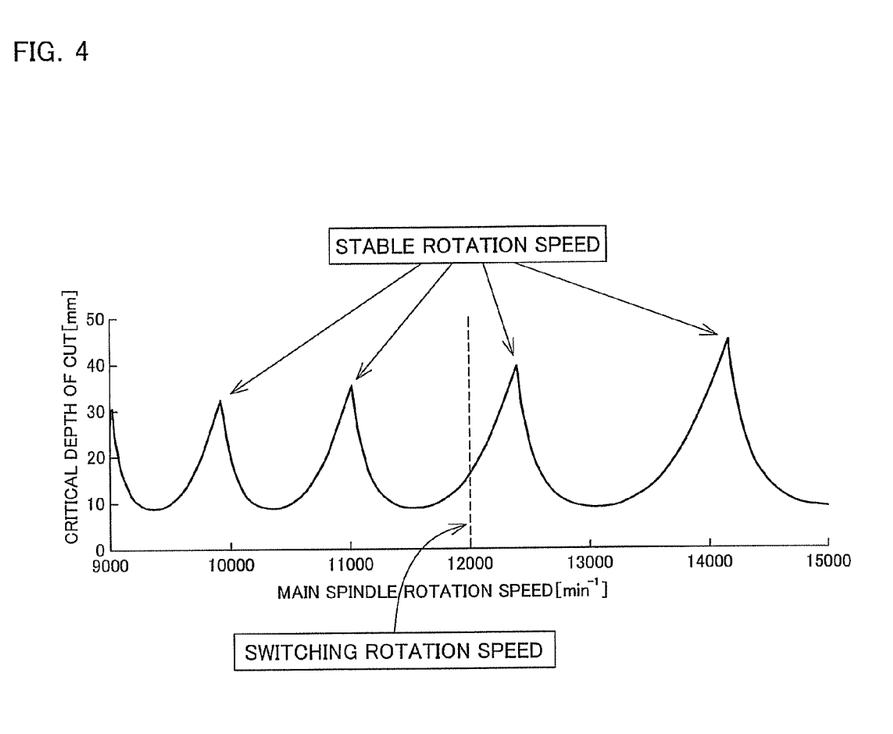
FIG. 4 is a graph schematically showing the relationship between the stable rotation speeds and the critical (upper-limit) depth of cut.

When the chatter vibration detection unit 11 detects "chatter vibrations", the stable rotation speed arithmetical unit 12 calculates stable rotation speeds using a chatter frequency corresponding to the "chatter vibrations" by the following equation (1).

$$\text{Stable rotation speed} = \{60 \times \text{chatter frequency/the number of tool flutes} \times (\text{k number}+1)\} \quad (1)$$

where the number of tool flutes is the number of flutes of the tool installed on the main spindle 3, and is inputted and set in the stable rotation speed arithmetical unit 12 beforehand, and k number is an integer equal to or greater than 0, and substituted in sequence of k=0, 1, 2, 3, 4 . . . . In this way, a plurality of stable rotation speeds are obtained. The relationship between the stable rotation speeds and the critical (upper-limit) depth of cut are represented by a curve in FIG. 4.

The control device 5 thus changes the rotation speed of the main spindle 3 to one of the stable rotation speeds so as to suppress "chatter vibrations". The following description is based on the premises that the rotation speed of the main spindle 3 at the time of detection of the "chatter vibrations" is 10,000 $\text{min}^{-1}$, and the calculated stable rotation speeds are 9,900 $\text{min}^{-1}$, 11,000 $\text{min}^{-1}$, 12,400 $\text{min}^{-1}$ and 14,200 $\text{min}^{-1}$. It is generally known that increase in the rotation speed of the main spindle serves to more effectively suppress "chatter vibrations", because the increase in the rotation speed of the main spindle makes an upper-limit depth of cut greater. With this in view, the optimum rotation speed selection unit 16 places first priority on 14,200 $\text{min}^{-1}$, but this rotation speed is higher than the maximum rotation speed stored in the permissible rotation speed storage unit 15 (i.e., the maximum rotation speed of the main spindle 3 in the pertinent machining operation), therefore, this rotation speed is not adopted as the optimum rotation speed. Next, the rotation speed on which the optimum rotation speed selection unit 16 places second priority is 12,400 $\text{min}^{-1}$, but this rotation speed is higher than the switching rotation speed stored in the switching rotation speed storage unit 14. That is, the rotation speed, if changed to this rotation speed, would cross the switching rotation speed, and the preload of the bearings for supporting the main spindle 3 would be changed, which would cause the dynamic characteristic of the main spindle 3 system to change, to thereby change the "chatter frequency". As a result, expected effective suppression of "chatter vibrations" would become impossible. For this reason, this rotation speed is also not adopted as the optimum rotation speed. Eventually, 11,000 $\text{min}^{-1}$ is adopted as the optimum rotation speed in that this rotation speed is not higher than the maximum rotation speed and does not change the dynamic characteristics of the main spindle 3 system.

Thereafter, the NC device 17 transmits an instruction to the rotary shaft housing 1 so that the rotation speed of the main spindle 3 is changed to the optimum rotation speed selected in the optimum rotation speed selection unit 16.

On the other hand, the case may be such that the switching rotation speed across which the preload of the main spindle 3 changes is 13,000 $\text{min}^{-1}$, the rotation speed of the main spindle 3 at the time of detection of the "chatter vibrations" is 13,500 $\text{min}^{-1}$, and the calculated stable rotation speeds are 9,900 $\text{min}^{-1}$, 11,000 $\text{min}^{-1}$, 12,400 $\text{min}^{-1}$ and 14,200 $\text{min}^{-1}$. In this case, 14,200 $\text{min}^{-1}$ cannot be adopted because this rotation speed exceeds the maximum rotation speed as in the aforementioned case. 12,400 $\text{min}^{-1}$ also cannot be adopted because the rotation speed, if changed to this rotation speed, would cross the switching rotation speed. As such, there exists no stable rotation speed which can be adopted. Therefore, in this embodiment, if such a situation arises, the optimum rotation speed selection unit 16 uses the warning display device 18 to inform the operator of this situation.

With the vibration suppressing method and vibration suppressing device 10 as described above, a maximum rotation speed of the main spindle 3 and a switching rotation speed across which a dynamic characteristic of the main spindle 3 system changes are stored, then an optimum rotation speed that is a rotation speed which is not higher than the maximum rotation speed of the main spindle 3 and to which the rotation of speed of the main spindle 3 is changeable without crossing the switching rotation speed is selected from the stable rotation speeds, and the rotation speed of the main spindle 3 is changed to the optimum rotation speed selected. Accordingly, the possibilities of changing the rotation speed of the main spindle 3 to a rotation speed which cannot be attained or a rotation speed such that change of the rotation speed to that speed changes the dynamic characteristic of the main spindle 3 and thus makes it impossible to suppress "chatter vibrations" can be eliminated, so that the "chatter vibrations" can be suppressed more effectively than by any existing methods.

Moreover, provision of the warning display device 18 makes it possible to inform an operator of a particular situation such that no selectable stable rotation speed exists. Accordingly, the operator can swiftly attend to the situation, for example, by stopping the rotation of the main spindle 3, so that damage to the tool installed or any other risk involved can be prevented.

Steps of the vibration suppressing method and components and their arrangement of the vibration suppressing device as consistent with the present invention are not limited to those of the above-described embodiment, and various changes and modifications may be made to the configurations concerning the detection and computation, and the control for suppressing vibrations, where appropriate on an as needed basis without departing from the scope of the present invention defined in the appended claims.

The aforementioned embodiment is configured to calculate stable rotation speeds using the vibration sensors 2a-2c, but the method may be configured in a way different from the aforementioned embodiment but still consistent with one or more aspects of the present invention, e.g., the stable rotation speeds may be obtained from a stability limit diagram as shown in FIG. 4 created in advance with the mechanical system's dynamic characteristics obtained through impulse excitation, and stored in the stable rotation speed storage unit (i.e., determination in the stable rotation speed arithmetical unit can be omitted). It is however to be appreciated that the method in which stable rotation speeds are calculated by the stable rotation speed arithmetical unit according to the above-described embodiment is advantageous in that stable rotation speeds calculated based upon "chatter vibrations" actually occurring are provided, i.e., more reliable values of stable rotation speeds can be produced, and that expensive equipment required for impulse excitation can be dispensed with.

In the above-described embodiment, vibrational accelerations of the rotary shaft are detected by vibration sensors, but the displacement of the rotary shaft of the sound pressure due to vibrations may be detected, instead, so that an optimum rotation speed is calculated based on the displacement or the sound pressure.

Furthermore, in the above-described embodiment, for the purpose of determining the optimum rotation speed, vibrations of a rotary shaft of a machine tool are detected, but vibrations of a stationary body may be detected, instead. To be more specific, the machine tool is not limited to a machining center which is configured to rotate a tool but the present invention may be applied to a lathe or other machine tools which is configured to rotate a workpiece. Furthermore, the positions in which the detection units are installed, and the number of detection units may be changed where appropriate in accordance with the type and size of the machine tool.

Moreover, it is to be understood that change of the rotation speed may be carried out manually. It is also to be understood that the switching rotation speed and the maximum rotation speed, etc. may be set as appropriate, and not be limited to the values taken in the above-described embodiment by way of example. The values of stable rotation speeds are also to be understood to be configured without limitation irrespective of the values exemplified in the above-described embodiment.

The invention claimed is:

1. A vibration suppressing method implemented in a machine tool having a rotary shaft for use in rotating a tool or a workpiece, for suppressing chatter vibrations generated during rotation of the rotary shaft, the vibration suppressing method comprising:
   a first step of detecting chatter vibrations using a vibration detection unit;
   a second step of storing a plurality of stable rotation speeds at which the chatter vibrations are expected to be suppressed, and at least one switching rotation speed across which a dynamic characteristic of a rotary shaft system changes;
   a third step of selecting an optimum rotation speed from the plurality of stable rotation speeds, the optimum rotation speed being a rotation speed to which a rotation speed of the rotary shaft is changeable without crossing the switching rotation speed; and
   a fourth step of changing the rotation speed of the rotary shaft to the optimum rotation speed.

2. The vibration suppressing method according to claim 1, further comprising steps, in the second step, of:
   determining a chatter frequency of the chatter vibrations detected in the first step; and
   determining the plurality of stable rotation speeds using the determined chatter frequency.

3. The vibration suppressing method according to claim 1, further comprising, a step, in the second step, of storing at least one of an upper limit rotation speed and a lower limit rotation speed for at least one of a type of the rotary shaft and a type of the tool or the workpiece to be mounted on the rotary shaft,
   wherein the optimum rotation speed to be selected in the third step is a rotation speed to which a rotation speed of the rotary shaft is changeable without crossing the switching rotation speed and which is within a range defined by at least one of the upper limit rotation speed and the lower limit rotation speed.

4. The vibration suppressing method according to claim 2, further comprising, a step, in the second step, of storing at least one of an upper limit rotation speed and a lower limit rotation speed for at least one of a type of the rotary shaft and a type of the tool or the workpiece to be mounted on the rotary shaft,
   wherein the optimum rotation speed to be selected in the third step is a rotation speed to which a rotation speed of the rotary shaft is changeable without crossing the switching rotation speed and which is within a range defined by at least one of the upper limit rotation speed and the lower limit rotation speed.

5. The vibration suppressing method according to claim 1, further comprising, a step, in the third step, of displaying a warning on a display device when no rotation speed to which a rotation speed of the rotary shaft is changeable without crossing the switching rotation speed is found in the plurality of stable rotation speeds stored in the second step.

6. The vibration suppressing method according to claim 2, further comprising, a step, in the third step, of displaying a warning on a display device when no rotation speed to which a rotation speed of the rotary shaft is changeable without crossing the switching rotation speed is found in the plurality of stable rotation speeds stored in the second step.

7. The vibration suppressing method according to claim 3, further comprising, a step, in the third step, of displaying a warning on a display device when no rotation speed to which a rotation speed of the rotary shaft is changeable without crossing the switching rotation speed is found in the plurality of stable rotation speeds stored in the second step.

8. The vibration suppressing method according to claim 4, further comprising, a step, in the third step, of displaying a warning on a display device when no rotation speed to which a rotation speed of the rotary shaft is changeable without crossing the switching rotation speed is found in the plurality of stable rotation speeds stored in the second step.

9. A vibration suppressing device provided in a machine tool having a rotary shaft for use in rotating a tool or a workpiece, for suppressing chatter vibrations generated during rotation of the rotary shaft, the vibration suppressing device comprising:

a vibration detection unit configured to detect chatter vibrations;

a storage unit configured to store a plurality of stable rotation speeds at which the chatter vibrations are expected to be suppressed, and at least one switching rotation speed across which a dynamic characteristic of a rotary shaft system changes;

an optimum rotation speed selection unit configured to select an optimum rotation speed from the plurality of stable rotation speeds, the optimum rotation speed being a rotation speed to which a rotation speed of the rotary shaft is changeable without crossing the switching rotation speed; and a rotation speed change unit configured to change the rotation speed of the rotary shaft to the optimum rotation speed.

* * * * *

UNITED STATES PATENT AND TRADEMARK OFFICE
CERTIFICATE OF CORRECTION

PATENT NO. : 9,011,052 B2
APPLICATION NO. : 13/245117
DATED : April 21, 2015
INVENTOR(S) : Hiroshi Ueno It is certified that error appears in the above-identified patent and that said Letters Patent is hereby corrected as shown below:

Title Page, Item (54) and in the Specification, Column 1, lines 1-3, Title

Please change: "VIBRATION SUPPRESSING METHOD AND VIBRATION SUPPRESSING DEVICE FOR US IN MACHINE TOOL" to -- VIBRATION SUPPRESSING METHOD AND VIBRATION SUPPRESSING DEVICE FOR USE IN MACHINE TOOL --

Signed and Sealed this
Third Day of November, 2015

Michelle K. Lee
*Director of the United States Patent and Trademark Office*